United States Patent Office 2,734,482
Patented Feb. 14, 1956

2,734,482

THE METHOD OF CONTROLLING THE SEX OF AVIAN EMBRYO, IMPROVING EMBRYO HATCHABILITY AND IMPROVING VIABILITY OF THE HATCHED CHICK

William Seltzer, Vineland, N. J., assignor to Vineland Poultry Laboratories, Vineland, N. J., a partnership No Drawing. Application June 19, 1953, Serial No. 362,947

33 Claims. (Cl. 119—1)

This invention relates to hatching avian eggs, more particularly, to eggs of the more common and more widely used birds or fowl best illustrated by chickens, ducks and the like, of which, as is well known, chickens are raised in vast quantities, both for egg supply and for their food value; more particularly, this invention relates to the treatment of avian eggs for materially influencing in favorable direction and for controlling various inter-related physiological and biological processes and properties of the developing egg embryo and of the hatched bird, with the object of materially improving the economics of operation of hatcheries and of avoiding or materially alleviating, in a practical and efficient manner, substantial burdens and losses inherent in present-day commercial hatchery practice.

It is known that in many parts of the United States chicken hatchery practice faces, and has to meet, high demand for female chicks, principally for the production of eggs for the market, and in many cases to be raised and sold on the market as "roasters"; under such circumstances male chicks are not in demand and, rather than feed and care for them any longer than is necessary, the hatchery destroys them as soon as their sex can be determined or, in some instances, sells them to a surplus chick buyer, where they bring a price on the order of about one cent each compared to a price of around forty cents each for which female chicks are sold. Where about half of the incubated eggs produce male chicks, the resultant manifold character of the economic loss and burden becomes apparent.

In other sections of the United States the market demands on hatcheries, as is also well known, are somewhat contrariwise in that it is the male chick that is of economic value for the production of "broilers." Since cockerels grow approximately one-third faster than pullets, it is important to know in the production of broilers as early as possible which are the male chicks and to effect separation and disposition of the undesired female chicks. In still other sections cockerels and pullets have more or less equality of uses or demand for respectively different ultimate purposes, and here, too, such separation at an early age is highly desirable.

In sum and as is well known, millions of chicks are hatched each year throughout the United States with only a portion of the annual hatch yielding a return and serving a useful purpose, the remainder representing economic burden and loss. Standard hatchery practice generally entails either selling chicks as hatched, namely, as a mixture of males and females, about equally divided, or undertaking sex separation of the hatched chicks as soon as possible. The latter procedure, however, also entails losses or expense. Ordinarily, as is well recognized, it is difficult to determine the sex of a chick until some growth has taken place, involving a matter of some weeks, during which care and feeding are costly; alternatively, persons trained as "sexers" can be hired to examine one-day old chicks and, for a fee per chick, separate the males from the females. Usually, about half of the chicks thus separated are marketable or serve a useful purpose and hence are profitable; the remaining half is usually destroyed to prevent further losses.

Over and above these known factual considerations which bring about substantial economical burdens and losses caused by sex differentiation according to market demand or marketability of hatched chicks, is superimposed the loss or losses caused by the percentage factor of hatchability of the incubating eggs and the viability of the hatched chicks; it may be stated generally that the proportion of eggs that actually hatch normal, healthy chicks is about 70%, the remaining 30% representing loss.

One of the dominant aims of this invention is to provide for materially alleviating or substantially overcoming such losses and handicaps as those mentioned above, and to do so in a manner that may be carried out economically and on a large scale or commercial basis that can be easily and at low cost incorporated into present-day hatchery and poultry farm practices, and with good and efficient results.

The above-mentioned difficulties, handicaps, losses and burdens imposed upon hatcheries have been long existent, and over a period of many years the need for alleviating these conditions has been well recognized, even to the extent of the proposals and attempts made, during such period, for controlling the sex of the embryo in the embryonated or incubating eggs so that only the sex desired would issue from each setting of fertile eggs, but no practicable or workable or successful means for such sex control has thus far come into being, excepting for my invention as later disclosed herein. The direction which these prior proposals and attempts have taken to try to accomplish this sex control has been to inject, by so-called hypodermic needle and syring, hormones or hormone-like substances into embryonated eggs, or in other unsuccessful attempts, to implant, also through a hole made in the egg shell, fragments of sexually differentiated gonad, in the embryo in the attempt to affect the latter by hormones secreted by these fragments, in order to influence the gonads of the embryo to differentiate into those of the desired sex. Such experiments as these have succeeded no further than to show that estrogenic substances can influence gonads to differentiate in a female direction and androgens can modify gonads in a masculine direction; there are many reasons why these attempts have not succeeded in bringing any relief to poultry farmers or hatchery operators. Some of the major reasons include the following:

1. It has not been possible to influence sex of the embryo unless the process of puncturing the egg shell and administering the hormones is delayed until the egg has been incubated at least forty-eight hours, when fertile eggs can be determined by candling. And these prior efforts indicate no full agreement as to the exact optimum time of administration of hormones excepting that, as would naturally be expected, it should be done before the period of normal sex differentiation in the embryo.

2. Eggs must be handled singly, one by one, and moreover, by technicians especially skilled and careful, for not only must the shell be punctured or broken through, later to be sealed over, but the hormone-containing material has to be located, within the egg, at a particular or predetermined site in relation to the location of the embryo, and all this must be done without inflicting excessive mechanical injury to the embryo or the living tissues surrounding it. Also, there is uncertainty as to what is the optimum site or location for placing the hormone-containing or hormone-secreting material; for example, should it be the albumen, or the air sac, or the allantois, or some other interior part or region of the incubated egg?

3. Whatever the selected site, effectiveness of sought-for sex differentiation has been found to vary with the quantity of hormones made available and the distance of the supplied source of such hormones from the embryo, and these factors make the hormone administration exceedingly difficult as well as variable and uncertain in results; for example, just consider, as to each individual egg, the problem presented by having to determine the location of the embryo as a target and then seeking to gauge accordingly the quantity of hormones to inject and to place it just the right distance from the embryo.

4. Invariably hatchability has been reduced and viability of the birds which hatched also reduced, and suppression of early growth of hatched birds has also been noted.

5. A fatal and inherent defect, in these attempts made over a period of many years, is in the recognized and well-established fact that eversion of the cloaca is caused in the hatched birds so that those which survive suffered, throughout life, from difficulty in feces elimination, there being present a continuous diarrhea, a condition known and referred to as "wet backs."

6. In many cases true sex reversal failed to take place, since the sexual modification effected in the hatched birds were only partial or transient, and the genetic form was resumed after several weeks.

7. These prior attempts are failures and practical application thereof precluded for such reasons as those just described, all of which is borne out by the fact that they have not gone into commercial or practical use; hatcheries and farms continue to face the economic burdens and losses earlier above described.

In contrast, I have discovered a practical and effective method for controlled sex differentiation that is free from the fatal and other defects and shortcomings above described and which can be carried on efficiently and economically, in practice, on a large or commercial scale, even by unskilled persons; by my invention individual handling of eggs is avoided and large numbers of eggs can be simultaneously treated, with assured results and in a manner which does not disturb or detrimentally interfere with usual hatchery operations but can be dependably and economically incorporated into the usual or routine steps or stages of egg handling inherent in hatchery operations. Moreover, by my discovery I am enabled in a simple and reliable manner to avoid the known or recognized difficulties and vagaries and variables as to the factors of timing, distance, quantity, and site of deposition of sex-influencing materials, and thus further to facilitate alleviating or overcoming the economic burdens and losses involved in current hatchery operations as earlier above described.

According to my invention I make it possible for the growing embryo within the incubating egg to take up or absorb sex-differentiating substances (estrogenic substances to influence its gonads in female direction, or androgens to influence its gonads in masculine direction) at a rate and over a period of time and in a manner very similar to or dependent upon the manner and mechanisms by which the growing embryo partakes of the materials of the surrounding yolk and albumen to sustain the life and growth of the embryo until it hatches or breaks out of the egg shell; this latter process is a continuous one throughout the period of incubation of the egg, the embryo continuously and progressively drawing upon and finally using up the various and many constituents of the yolk and albumen which it needs for continued growth and for sustenance of its own life.

By my process I am enabled to initially store the sex-differentiating material, in wide distribution and remote from the cluster of living cells or protoplasmic material from which the embryo develops, called the "blastoderm" in fertilized eggs, and in such manner that the embryo can make use of them and draw upon them in substantially the same rate and manner in which it draws upon the life-sustaining materials of the yolk and albumen, and such storage and distribution I achieve by causing the shell membrane and the egg membrane, later described, and which together rest in close engagement with or adherence to the inside surface of the shell, in coaction with the porous shell itself, to absorb, or hold in their pores, the liquid carrier with its sex-differentiating material; thereby, in effect, the sex-differentiating material is more or less uniformly distributed and retained throughout the composite external envelope which the shell and these membranes form about the albumen and yolk and remote from the blastoderm, so that there is at no time or at any place closely adjacent the growing embryo any harmful concentration of the estrogenic hormone or androgen such as is inherent in the above described unsuccessful injection or implantation methods. Moreover, this enveloping remote distribution of the sex-differentiating material I achieve without having to puncture or cut or break open the shell and it is unnecessary, in practicing my process, to be concerned with distance or quantity in relation to a point-like target or with precision of timing, as in the above-mentioned unsuccessful attempts. The above described remote distribution of the selected sex-differentiating material I can effect even just prior to setting the eggs for incubation or also at various times after setting, without regard to the apparently critical 48-hour period of incubation which these unsuccessful attempts seem to indicate as the optimum or critical time of injection of sex-differentiating material. In effect, the more or less uniform distribution of the sex-differentiating material throughout the substantial expanse of this composite membrane-and-shell envelope and its retention therein, without point-like concentration thereof anywhere, for gradual use or consumption thereof by the internally remote embryo along with and by substantially the same processes as the embryo draws upon the life-sustaining materials of the yolk and the albumen, achieves what I term an "umbrella" effect as to both time and physiological or biological action; the growing embryo is effectively protected against harmful or destructive effects or reactions caused by concentrated or localized dosages as well as against the vagaries and variables which the time of application of such dosages causes. The critical character of timing and dosage is by my invention avoided and the growing embryo is given a widespread umbrella-like protection in that the physiological or natural processes by which the growing embryo partakes of life-giving substances from the yolk and the albumen are permitted simultaneously and at substantially similar rates to draw upon the widely distributed and remotely stored sex-differentiating material and thus gently and progressively influence its gonads; this action is a continuous one. There is a continuous diffusion of the unconcentrated and distributed sex-differentiating material through the shell membrane and the egg membrane into the egg interior, particularly into the changing character of the albumen content and yolk content as the embryonic membranes develop and grow and continue to draw upon the growth-providing materials, thus also and concurrently therewith drawing upon the sex-differentiating material.

This protective "umbrella" effect, both as to the element of time of initial treatment of the eggs with sex-differentiating materials and the physiological assimilation or consumption thereof by the embryo, is fully borne out by the actual practice of my invention, as is later more fully described, whereby I have achieved dependable sex control with good hatchability and viability throughout a wide range of specific times of initial supply to the eggs of the sex-differentiating material, as well as with varying quantities of the latter. For example, I have treated eggs, to achieve the above described storage and distribution of estrogenic hormones or androgens, one day before setting, on setting, and upon the first, second, third, fourth, and sixth day of incubation, always with good results, thus demonstrating that one need not be concerned with still-uncertain optimum or doubtful elements of time nor with concentrated quantities. From these demonstrated facts one can conclude that, once the sex-differentiating substance is stored and distributed, as in the above described composite envelope of shell-and-egg membranes and shell, even before incubation and hence before there is a developing embryo present, the utilization of the sex-differentiating material awaits or proceeds only as called for or drawn upon by the developing embryo in the course of the physiological and biological activities that accompany its normal growth and development. This umbrella effect makes it possible, as in operating a hatchery, to treat the eggs "on setting," that is, just before they are placed in the incubator, and as is about to be explained the eggs need not be individually handled or treated but can be simultaneously treated in large numbers or quantities. Once placed in the incubator, whether the treatment is on setting or alternatively on any day of incubation up to and including the sixth day, they need not be disturbed or removed for additional sex-differentiating treatment.

The yolk, which is retained by the yolk membrane, in effect cradles, in fertilized eggs, the fertilized cells, or blastoderm, from which the embryo comes into being, and surrounding the yolk is the albumen which thus also overlies the embryo; the albumen, in turn, is retained within and enveloped by the above-mentioned egg membrane and the latter is in close contact with and adheres to the above-mentioned shell membrane, which at its outer surface is in close contact with and somewhat attached to the inner surface of the shell. The egg membrane and the shell membrane are somewhat like a two-ply continuous and unbroken envelope, and they are in close engagement with each other throughout their entire area except at the blunt end of the egg where there is a separation between the two to form a space, which is known as the air cell, for the supply of air to the embryo when respiration begins, it being noted that the head of the embryo is at the blunt end of the egg and hence adjacent the air cell. The shell membrane and the egg membrane are porous and they, in turn, are surrounded by the shell, which is also porous; the pores in the egg shell are quite numerous.

It is in such pores that, according to my invention, I store and distribute the sex-influencing material which I make up with a suitable liquid carrier therefor, so that it can be taken in through the pores of the shell by applying it to the external surface of the shell; this I may do in various ways. For example, I may provide a suitable egg-carrying tray, apertured to provide a suitable number of openings each dimensioned to receive and support an egg therein with the egg end protruding downwardly, preferably the peaked end. Such a carrier, of any desired capacity, such as 100 eggs, can be easily handled manually or mechanically. Or I may use the standard open wire-mesh-bottom tray of the incubator itself, thus avoiding even the need for such extra or special equipment. When loaded, it is lowered into the prepared liquid mix of sex-influencing material and liquid carrier to enter the eggs into the liquid to a depth of about 1 or 1¼ inches, thus wetting a corresponding region or area at the peaked ends of the eggs, a corresponding amount of the liquid adhering to the exterior of each shell throughout that area. To insure good wetting, the eggs may be held dipped into the liquid for about five seconds. They are then placed in the incubator in the usual manner and incubated. Individual treatment or handling of eggs is avoided, large numbers of eggs may be simultaneously and uniformly treated, the operation can be carried on by unskilled persons, and this wetting step, in suitable quantities of eggs per step, easily fits into the routine of incubator operation. Or I may introduce the liquid mix into the humidifying device or system of the incubator, so that atomized or minute particles of the mix are carried to and uniformly deposited on the entire surface of each egg in the incubator along with the moisture particles of the humidifying or fogging effect achieved by the humidifying system; in this manner, good wetting of and continuous supply to the egg-shell exterior can also be achieved, commencing with the start of incubation.

Illustrative estrogenic or androgenic substances and liquid carriers therefor, to make up the liquid mix for external wetting of the shells of the eggs, are set forth later hereinafter. But by such wetting, the liquid-carried sex-influencing material is taken up in the pores of the shell of the egg, and even though the entire exterior of the shell is not wetted (though it may be if desired, as in continuous wetting along with humidifying, or simply by effecting complete immersion of the eggs carried by the carrier tray), it soon spreads, internally, throughout the entire expanse of the egg shell and of the interiorly contiguous shell membrane and egg membrane. This distribution apparently takes place by coactions between the pores of the egg shell and the structure of these membranes which are more or less fibrous and contain numerous and well-distributed pores and minute channels or passages. While the pores in the shell are probably principally directed transversely of or through the thickness of the shell and may thus provide passages for ingress of the liquid carrier from the outside of the shell to the inside, there is movement and distribution of the sex-influencing liquid along and throughout the entire extent of the inner surface of the shell, effected apparently by way of minute spaces, passages, or channels within the two membranes and also between the closely engaged inside surface of the shell and contiguous outer surface of the shell membrane; it coats the entire inner surface of the shell. This movement of distribution, when only a portion of the exterior of the shell is wetted, and the fact of more or less uniform distribution throughout the interior area or expanse of the shell can be demonstrated, in the laboratory, by including a suitable dye in the sex-influencing treatment liquid and in that manner, by the color effect, trace and substantiate its movement and distribution. Such distribution can be aided in various ways, as is later set forth.

The thus widely distributed and unconcentrated liquid that carries the estrogens or the androgens is probably also retained in the minute pores and passages of the fibrous structure of the shell membrane and the contiguous egg membrane, and when these membranes and the blastoderm and yolk and albumen become biologically and physiologically active as incubation commences or proceeds to develop the embryo and its various surrounding and other organs and membranes, the sex-influencing elements of the above distributed carrier liquid are continuously drawn upon and activated into the continuing and progressing biological processes just about as and concurrently with the growth-giving and life-sustaining constituents contained in the yolk and albumen are activated and utilized in and by the developing embryo. The sex-differentiating substance, estrogens or androgens, is thus biologically brought into the developing system of the embryo by the continuing physiological processes of embryo development and correspondingly influence its gonads to differentiate in female direction when estrogenic hormones are used in the carrier liquid, and to differentiate in male direction when androgens are used in the carrier liquid, doing so without risk or chance of detrimental or destructive concentrated application thereof to the gonads, and influencing the latter continuously during that period of time before the gonads would normally or naturally effect sex differentiation themselves. These processes may be aided by continuous diffusion of the unconcentrated and widely distributed sex-influencing liquid through the shell membrane and the egg membrane into the egg interior as the embryonic membranes develop and grow with continued incubation, but I believe that also various natural and developing physiological processes take part in safely bringing the gonad-influencing substance into the immediate system of the growing embryo.

For example, out of the extra-embryonic part of the blastoderm is formed the closed sac or membrane called the amnion, which surrounds the embryo and which in turn is joined to and surrounded by the enveloping membrane called the chorion; the latter is or becomes intimately united with the allantois, which in large measure extends into widespread proximity or contact with the inner surface of the above-mentioned egg membrane and forms a substantial part of the developing vascular system, containing a system of blood vessels for aerating the circulating blood of the embryo by air which penetrates the porous egg shell. The estrogens or androgens, as the case may be, can be taken up by this circulatory system, being thinly distributed in the liquid carrier throughout the same or similar or contiguous regions, as above explained, throughout which the porosity of the egg shell permits air to enter therethrough, aided by slow diffusion of the carrier liquid into and throughout the shell membrane and egg membrane to be drawn upon by the just-described vascular system. The latter carries them throughout the growing embryonic structure in an uninterrupted natural flow which can act uniformly and continuously on the embryonic gonads and which is maintained or sustained by the above-described safe and remote umbrella-like storage and distribution supply; thus there are eliminated questions of site and distance and also risk of mechanical injury and of quantitative concentrations and the timing of the latter.

Whatever may be the critical day or period, during incubation, in which natural sex differentiation sets in or takes place in the chick embryo (for example, one authority states it to be between the fifth and eighth day of incubation), it is by my invention completely blanketed; not only am I enabled completely to circumvent all uncertainty as to timing and to safely influence the gonads in desired sex direction (female by estrogens and male by androgens), but also to thereafter fix and maintain against reversion the ensuing sex development in the embryo because throughout the remainder of the incubation period the estrogen or the androgen continues to be supplied through natural physiological processes from its remotely situated and safely distributed storage in the egg-and-shell membranes.

My invention permits and provides wide adaptability with respect, for example, to the kind or type of liquid carrier to employ for the embryo-affecting substances, and permits employment of a wide range of carrier liquids. I have employed solutions of estrogenic hormones and of androgens in emulsion form, in ethyl alcohol solution, in aqueous solution and suspension, in propylene glycol, mineral oils and fatty oils. Any suitable or known sex hormones, that is, estrogens and androgens, may be employed; the former possess or induce female activity and the latter possess or induce male activity, and as is also known they may be natural in origin (animal sources) or they may comprise artificial substances which closely resemble the natural substances. Some of these artificial substances are chemical modifications of naturally-occurring hormones and others are completely synthetic substances derived from chemical substances other than natural hormones. In all cases, as is also known, whether natural in origin or chemically modified or synthesized, they possess respective properties referred to as estrogenic and as androgenic. The more common or more readily available estrogens and androgens are, of course, preferably employed, such as (of the estrogens), estrone and estradiol (which are of animal origin); or stilbene derivatives of which the type substance is diethylstilbestrol, the latter being well known and easily available, also diethylstilbestrol dipropionate; allenolic acid (of the estric acids) and its derivative dimethyl ethyl allenolic acid; and (of the androgens) the type compound testosterone, more particularly pregnenolone, methyl testerone, testosterone propionate and dehydroisoandrosterone; these I have used with good results. Because of the manner in which my invention causes the embryo chick to draw naturally upon the remotely stored and widely and thinly distributed estrogen or androgen as above described, quantitative estrogen or androgen application to the eggs according to my invention is not critical in the sense that at least a minimum be applied and stored with the above described umbrella effect; quantitatively, the estrogen or androgen is supplied to each egg in amount from 0.01 mg. to about 2.7 mg. per egg. Illustrative quantitative applications per egg, when wetting is effected by partially submerging each egg, are later set forth; when supplied in atomized form, as along with humidification of this incubator atmosphere, the corresponding quantitative amount is supplied preferably during the initial 6 or 8 days of incubation, though lesser rate of supply may be continued throughout the rest of the incubation period.

Bearing in mind the above-mentioned aerating provided by the pores of the egg-shell and by the internally coacting vascular and other physiological organs, tissues, membranes or the like, it is desirable not to affect detrimentally the pore action of the shell. Oily liquid carriers for the sex-influencing substance I may also employ, yet they have the tendency of closing the shell pores and thereby "smothering" the egg and embryo or of detrimentally retarding movement or flow therethrough, in that they are relatively more viscid than other liquid carriers. Nevertheless, I can safely employ them according to my invention in that I can avoid complete immersion of the tray-carried eggs, a step which might close all or too many pores, and enter the eggs into the liquid mix to only about 1 or 1¼ inches as above described, leaving the rest of the expanse of the egg-shell exteriorly unencumbered by the liquid mix and thus assuring ample freedom of air flow through its pores for needed aerating physiological processes; in such case, the above-described internal coactions of the shell membrane and egg membrane achieve uniform distribution of the liquid mix for peripheral storage thereof to be progressively drawn upon by the vascular system for utilization in gonad influencing or control as above described. Or I may introduce such oily liquid carriers in admixture with the sex-influencing substances into the incubator atmosphere in finely-divided or atomized form, for deposit onto the entire external surface of the egg shell, as by incorporating the mix into the humidifying system of the incubator as above described, to continuously supply, at a suitably low rate, the sex-influencing substance to the exterior surfaces of all the eggs of the incubator charge; in this manner, though each egg shell is wetted throughout its entire external surface, the liquid mix is supplied thereto in a form and at a rate to preclude detrimental stoppage of the pores and to facilitate distribution to the interior shell membrane and egg membrane in that it is in effect also aided by the natural "breathing" or aerating processes that draw air through the shell pores. The resultant continuous external supply, in finely divided form, is fed to the shell-and-egg membranes in uniform distribution and can thus maintain and sustain the above described umbrella effect throughout the incubation period, leaving it to the natural biological and physiological internal activity to maintain natural and continuous gonad-influencing as above described. In either case, I may also include in the liquid mix any suitable emulsifying agent and water or a wetting agent, or a surface-active agent to facilitate passage through the shell pores, thus further lessening risk of detrimental interference with aerating action and system.

An illustrative oily liquid carrier is sesame oil. An illustrative estrogenic substance to use is diethylstilbestrol, hereinafter referred to as simply "D. E. S." The latter may be dissolved in the former. Preferably with such a solution and an emlusifying agent and water, a liquid mix may be made up so that 100 cc. of the emulsion contains 10 mg. of D. E. S. In either case, when eggs are immersed therein to a depth of about 1 to 1¼ inches, approximately 0.3 cc. of the solution or emulsion adheres to each egg; this represents about 0.03 mg. of D. E. S. Ensuing incubation and hatching, in usual manner, resulted in hatched chicks practically 100% female and no wet-backs.

Less viscid liquid carriers, it will now be clear, I may also and desirably employ; in admixture with sex-influencing estrogens or androgens, their passage through the shell pores and ensuing distribution to and throughout the shell-and-egg membranes, for safe and remote umbrella-like storage to be drawn upon by the vascular system, I have found takes place without material risk of shell-pore stoppage. Here I may wet the eggs externally as by tray-dipping them or by complete immersion, for a few seconds, or the wetting may proceed with commencement of incubation by incorporation of the liquid mix with the humidifying system of the incubator or otherwise continuously supplying the gonad-influencing liquid to the incubator atmosphere, in finely-divided or atomized form to wet the entire external shell surface. An illustrative non-oily type of liquid carrier may be ethyl alcohol; the estrogenic substance may be D. E. S. which is dissolved in the alcohol in the relation of about 5 mg. of D. E. S. to 100 cc. of ethyl alcohol U. S. P. Dipping the eggs to a depth of 1 to 1¼ inches, with ensuing incubation in usual manner, resulted in hatched chicks practically 100% female and no wet-backs.

Many practical tests of my invention under different conditions, and conducted also against control birds or control groups of eggs, substantiate practicable dependability of sex control and the achievement of advantages such as those above mentioned. Moreover I find that my invention overcomes other difficulties or obstacles heretofore recognized but never hurdled; they comprise variations in parental stock, variations in eggs from different flocks, and from egg to egg, and variations induced by different incubating conditions. Prior attempts have failed to solve these additional problems which, coupled with other proven uncertainties and unsolved problems as to timing, site, distance and quantity, plus reduced hatchability and viability, and uneconomic handling, coupled with unreliability of fixing sex, and the inherent and fatal "wet back" condition, have confirmed the recognized failures of such prior attempts. I have found that my invention, and I believe it is because of the above-described umbrella effects and coactions with the normal physiological processes, including that of the vascular system, of embryo development as incubation proceeds, successfully copes also with these additional variations and variables. For example, I have achieved successful results in sex control, in quantity incubation, of eggs of wide variety of parental stock, including White Leghorns, New Hampshire Reds, and various crosses in which the parent stock included Barred Rocks, White Rocks, New Hampshire Reds, and Rhode Island Reds. Neither such variables nor variations from egg to egg nor from flock to flock interfered with the working of my invention. Moreover I can achieve good hatchability and viability, without subsequent sex reversal or reversion to genetic form; for example female chicks derived from estrogenically influenced eggs incubated according to my invention have been raised to maturity and found to be normal layers of normal eggs. Significantly, of the many and wide scale tests I have made, never has a "wet back" been produced.

A number of examples of incubating procedures under different conditions and their results are set forth below by way of illustration and not by way of limitation; in all standard or usual types of incubators were used, with procedure modified as indicated. In several I also demonstrate further useful aspects of my invention in that I am enabled also to provide for improved hatchability, better viability of hatched chicks, and better health and vigor of fowl produced.

*Example No. 1*

Three groups A–1, A–2, and C–1 of 50 White Leghorn hatching eggs each were incubated, group C–1 serving as a control group of not wetted eggs against which to compare my invention when applied to the otherwise normal or usual course of incubation of test groups A–1 and A–2. On the sixth day of incubation of the latter, egg groups A–1 and A–2 were removed from the incubator; these eggs were at a temperature of about 103° F. and were wetted by entering their peaked ends, to a depth of from 1 to 1½ inches, for 5 seconds, in sex-hormone containing liquid mixes of temperature of 68° F. and then returned to the incubator. Note the simple operation involved.

The liquid mix thus applied to egg group A–1 was in the form of an emulsion in the following proportions: 25 mg. of D. E. S. dissolved in 50 cc. of sesame oil U. S. P. to which was added 5.5 gm. of a surface-active agent, such as an alkyl aryl polyether alcohol (commercially available and known by the trademark Triton X–45, a product of Rohm & Haas Co. of Philadelphia) and the solution was well stirred; to 11 cc. of this solution, 89 cc. of distilled water were added and the mixture stirred to form an emulsion. With the latter, group A–1 eggs were wetted as above described; quantitatively, each egg was thus supplied with about 0.015 mg. of the estrogenic hormone. This estrogen-containing liquid will be, for convenience, referred to as "solution ES." Various surface-active agents may be employed and Triton X–45 is in the foregoing set forth as illustrative. Other "Triton" surface-active agents may be used. Another illustrative agent which is also readily available on the market is Tween 80, a product of Atlas Powder Company of Wilmington, Delaware. "Triton" compounds are disclosed in U. S. Patent No. 2,454,541 along with variations thereof, and related and generally similarly acting dispersion agents are described in U. S. Patents Nos. 2,454,542, 2,454,543, 2,454,544 and 2,454,545, all issued to Rohn & Haas Company. Tween 80 is a polyethylene sorbitan mono-oleate and is one of a large group or family of related and generally similarly acting dispersion agents manufactured by Atlas Powder Company, some of which are known by the trademark "Span" just as "Tween 80" is one of a group of Tween trademarked products of the same company. Of these and other surface-active or dispersing products, many are used in food products and in medicinal and pharmaceutical compositions. They are compounds in which one portion of each molecule is hydrophilic and another portion is lipophilic; some are more hydrophilic than others, and some are more lipophilic than others.

The liquid mix applied to egg group A–2 was made up in the proportion of 5 mg. of D. E. S. dissolved in 100 cc. of ethyl alcohol U. S. P. Quantitatively, each egg was thus supplied with about 0.018 mg. of the estrogenic hormone D. E. S. This estrogen-containing liquid will be referred to as "solution AS."

Upon hatching of the three egg groups A–1, A–2, and C–1, the results were as follows:

| Group | Chicks Hatched | Females | Males | Percent Females | Comments |
|---|---|---|---|---|---|
| A–1 | 32 | 25 | 7 | 78 | No "wet backs." |
| A–2 | 37 | 37 | 0 | 100 | Do. |
| C–1 | 41 | 20 | 21 | 49.5 | Control group. |

Comparison with the control group results will be seen to be significant, particularly when it is borne in mind that estrogen application to the eggs of groups A–1 and A–2, to commence the above described "umbrella" effect, did not take place until the sixth day of incubation when, according to some authorities, natural sex differentiation (usually about 50–50, as the control group test shows) might already have set in, certainly as to a material number of eggs involved.

*Example No. 2*

Groups of 50 New Hampshire Reds hatching eggs were incubated with sex hormone application according to my invention, comparatively as against similar groups (for control) which were wetted with the same solution minus the sex hormone. Emulsions like solution ES in Example No. 1 and alcohol solutions like solution AS were used except for variations in sex hormone content, the latter being zero for comparative groups of eggs. In the case of two groups, identified as groups A–6a and A–10a in the following table, pyridoxine hydrochloride was added to the emulsion in one case and to the alsohol solution in the other, in the proportion of of 25 mg. per 100 cc. Standard or routine incubator practice was followed in each case, except for wetting the eggs, in each group except the control group C–11, by entering their peaked ends, to a depth of from 1 to 1¼ inches, for 5 seconds into the respective solutions employed for the different groups, the wetting, to commence the umbrella-like distribution and storage above described, being carried out at different times for different comparative groups, namely, "on setting," and on the 3rd, 4th, and 6th days of incubation. "On setting" wetting was effected just before entering the eggs into the incubators to start incubation; egg temperature and solution temperature were 20° C. Wetting on the 3rd, 4th, and 6th days of incubation of other groups, entailing simply removal of the egg trays, with their eggs, from the incubators for the 5 second wetting operation with prompt return to the incubators, was effected at egg temperatures of 39.5° C. and from 17° to 20° C. for the solution temperatures. The several groups affected and pertinent data and results, including respective ratios of female to male birds hatched, given in percentages, follow:

| Group | Time | Solution | Percent Females |
|---|---|---|---|
| A–3 | On setting | ES (10 mg. D. E. S. per 100 cc. emulsion). | 93 |
| C–3 | do | Emulsion only | 69 |
| A–4 | 3d day | ES (10 mg. D. E. S. per 100 cc. emulsion). | 80 |
| C–4 | do | Emulsion only | 58 |
| A–5 | 4th day | ES (10 mg. D. E. S. per 100 cc. emulsion). | 97 |
| C–5 | do | Emulsion only | 48 |
| A–6 | 6th day | ES (10 mg. D. E. S. per 100 cc. emulsion). | 100 |
| C–6 | do | Emulsion only | 25 |
| A–6a | do | ES plus pyridoxine hydrochloride (5 mg. D. E. S. plus 25 mg. Pyr. HCl per 100 cc. emulsion). | 96 |
| A–7 | On setting | AS (10 mg. D. E. S. per 100 cc. alcohol). | 56 |
| C–7 | do | Alcohol only | 33 |
| A–8 | 3d day | AS (10 mg. D. E. S. per 100 cc. alcohol). | 75 |
| C–8 | do | Alcohol only | 50 |
| A–9 | 4th day | AS (10 mg. D. E. S. per 100 cc. alcohol. | 100 |
| C–9 | do | Alcohol only | 44 |
| A–10 | 6th day | AS (10 mg. D. E. S. per 100 cc. alcohol). | 100 |
| C–10 | do | Alcohol only | 66 |
| A–10a | do | AS plus pyridoxine hydrochloride (10 mg. D. E. S. plus 25 mg. Pyr. HCl per 100 cc. alcohol. | 95 |
| C–11 | Controls | No solution or wetting | 50 |

Comparative test groups C–3, C–4, C–5, C–6, C–7, C–8, C–9 and C–10, in which the eggs were wetted with solutions devoid of estrogenic hormones, hatched an average of 49% female chicks, the rest being males; this was to be expected and just about matches the ratio of 50–50 in the hatch resulting from the not-wetted control group C–11. By comparison to both, however, the ratios of female chicks to male chicks produced out of the sex-controlled groups A–3, A–4, A–5, A–6, A–6a, A–7, A–8, A–9, A–10 and A–10a show the consistent success and results of processing incubation according to my invention; in three out of the ten groups, the hatched chicks were all female, a ratio of 100%, and in four of the groups the percentage of female chicks ranged from 93% to 97%, while in the remaining three groups, though the percentages are somewhat lower, female chicks invariably preponderate and substantially so. Significantly, the over-all percentage average of female chick production in these A-groups is just about 90%. Group A–6a, when compared to group A–6, shows that pyridoxine hydrochloride addition increases the efficacy of smaller quantitative hormone application. These female chicks matured in normal manner and six months after hatching were normal layers of normal eggs, and no "wet back" amongst them.

*Example No. 3*

Groups of 70 cross-breed or so-called "sex-link" hatching eggs were incubated according to my invention, with consistency of action and results, under still different conditions, as against control hatching eggs, all otherwise subjected to normal or standard incubator practices, resulting in still further confirmation of the action, as I now understand it as described earlier above, of my invention and of the many advantages thereof; moreover, as will presently be seen such confirmation follows from different conditions and evaluations as later summarized. In this example, also of substantial scope, I employ the emulsion type of solution like solution ES above described in Example No. 1, and include other variations, including elements of timing, thus to show also how my invention still further avoids or overcomes heretofore recognized obstacles and vagaries, thus far insuperable except for my invention, as to timing and other elements too. For example, note in the following data, how I am enabled to achieve sex control by initiating the above-described umbrella effect of storage and distribution even well before actual "setting" of the eggs, such as one day before setting. Again, standard or usual incubator operation or practice was followed in each case or group, excepting for wetting the eggs, in each group (except the comparative control group C–12), by entering their peaked ends to a depth of from 1 to 1¼ inches, for 5 seconds, into the respective solutions employed for the different groups, the wetting, to commence the umbrella-like distribution and storage above described, being carried out at different times for different comparative groups, namely, one day before "setting," on setting, and on the 4th and 6th days. One day before setting, and on setting, wetting of the eggs was effected with the eggs at temperature of 18° C. and the solutions at 3° C., to provide a temperature differential in aid of drawing the solution through the egg shell pores for initiating distribution and storage throughout the egg membrane and shell membrane as above described and for umbrella-like action mentioned above. Where groups of eggs were wetted after incubation had commenced, egg temperatures were about 40° C. and solution temperatures were 20° C. The several groups affected and pertinent data and results follow:

| Group | Time | Solution | Sex on Hatching By Plumage | | By Physical Exam. | |
|---|---|---|---|---|---|---|
| | | | Percent Female | Percent Male | Percent Female | Percent male |
| A–12 | 1 day before setting. | ES (10 mg. D. E. S. per 100 cc. emulsion). | 58.5 | 41.5 | 100 | 0 |
| A–13 | On setting | Same as A–12 | 50.0 | 50.0 | 95.5 | 4.5 |
| A–14 | do | Same as A–12 plus 0.2 mg. Riboflavin per egg. | 51.0 | 49.0 | 96.0 | 4.0 |
| A–15 | do | Same as A–12 plus 0.1 mg. Ferrous Sulphate per egg. | 42.8 | 57.2 | 100 | 0 |
| A–16 | 4th day | Same as A–12 | 42.3 | 57.7 | 100 | 0 |
| A–17 | 6th day | do | 41.4 | 58.6 | 100 | 0 |
| C–12 | Controls | No solution or wetting. | 50.0 | 50.0 | 50.0 | 50.0 |

Again, the control group (group C-12), as was to be expected, divided half and half as to the sexes of the hatched birds, as determined by physical examination which coincided with the genetic sex as indicated by the plumage of the birds. As against this control group data, note that, in groups A-12 to A-17 inclusive, genetic sex as indicated by plumage averaged 47.7% female and 52.3% male, closely approximating the expected 50-50 sex division in the hatch of control group C-12 but, since by physical examination the hatches of groups A-12 to A-17 were practically 100% female, the sex of the natural or potential 52.3% males was actually reversed physiologically and the 52.3% hatched as females. In the total groups A-12 to A-17, physical sexes resulting from processing the incubations according to my invention average 98.6% females and 1.4% males. Again, consistency of results from my invention are demonstrated. In four of the six groups A-12 to A-17, the hatched chicks were all female, a ratio of 100%, and in the remaining two groups (groups A-13 and A-14), the female percentage averaged 95.6%. Also, there were no wet backs.

As above noted, the practicing of my invention in incubating procedures achieves not only consistent and dependable sex control along with many advantages, but does so also at good or normal hatchability when compared to recognized average hatchery experience. The average fertility of eggs from hens of all flocks is said to be from 88 to 92 per cent; however, the proportion of eggs that actually hatch normal healthy chicks is about 70 per cent. By comparison, for example, hatchability for group A-12 above described is 74% and for group A-1 is 64%. It is possible that, in carrying on my incubating process, the developing embryo, though its hatchability and viability are demonstrably aided and facilitated by the above described umbrella effect including the wide and remote distribution of carrier liquid and sex hormones, free from detrimental concentration, to be drawn on by natural physiological and biological embryo processes as the embryo develops, may nevertheless suffer somewhat from or be handicapped by the presence of even the thinly and widely distributed sex-hormone-containing liquid in the shell membrane and the egg membrane as well as the movement thereof even as drawn upon by the developing embryo; it might be said to have a depressing effect upon, or a tendency to depress, hatchability. For example it might be contended that, as indicated in some of the many practical tests I have made (such as the 64% hatch in group A-1), hatchability is somewhat lowered; such few instances are, however, offset by average or normal or better than average hatchability in other tests (such as the 74% hatch in group A-2). As for viability of hatched fowl, the positive and consistent avoidance of cloaca eversion (the "wetback" condition so fatally inherent in the failures earlier above described) shows the successful solution of a heretofore insuperable problem or obstacle as to viability and health and vigor of the hatched fowl. As indicated in certain aspects of the processes described above under Example No. 3, I am enabled to materially ameliorate or to counteract such depressing effects or tendencies and this I do in the same manner and preferably in the same steps I employ in incubating eggs to produce chicks of selected sex.

For example, in incubating the egges of group A-15, I included, in the sex-hormone containing emulsion, an appropriate amount of iron sulphate to provide, in the umbrella-like or peripheral storage or distribution of the liquid as above described, a quantity of iron which is thereby similarly distributed and stored for the developing embryo to draw upon in the course of its natural physiological processes or for slow diffusion into those parts of the egg such as the yolk (to which natural iron content is principally confined) from which the embryo chick is supplied with growth-giving and life-sustaining constituents. Lesser quantitative amount of copper salts, such as copper sulfate, may in like manner be introduced. A hen's egg contains 0.8 mg. to 2.0 mg. of iron; a chick of one day of age contains 0.6 to 0.8 mg. of iron; and has no reserve to draw on for hemoglobin. By my process as illustrated in group A-15, I am enabled safely to supplement, as by the illustrative amount of 0.1 mg. of ferrous sulphate, the initial iron content of the egg thereby improving hatchability and vigor of the developing embryo and making it possible to improve the iron content of the hatched chick, thus giving it an initial reserve to draw upon for conversion into hemoglobin, in coaction with the copper content, and to draw upon for otherwise improving its strength and rate of growth, and for raising its standard of viability.

In like manner I can supply safely and efficiently other elements required or helpful in embryo development and in the growth, health and vigor of the hatched chick. Illustratively, as in group A-14, I may thus supply the vitamin B-complex riboflavin; the latter is normally present in both yolk and albumen and it is known that content of this vitamin, vital to both embryo and hatched chick, varies greatly in eggs, even in spite of ample inclusion thereof in the diet of the hens that are the source of the eggs. Individual hens vary in ability to transfer riboflavin to the eggs as well as differing in their own need or assimilation thereof; this is in general true of other vitamins, such as vitamin D and vitamin E. Accordingly, eggs even if or as selected for incubation cannot be said to provide or contain uniformity or even overall adequacy of vitamin supply such as riboflavin so vital both to the embryo for hatchability and to the hatched chick for viability. By my process, however, these deficiencies can be overcome and the growth-promoting capacity of the yolk and albumen of all the eggs increased. Again, my process achieves the safe distribution of the riboflavin, or any other desired vitamins that are oil or water soluble, throughout the large peripheral expanse of the egg-and-shell-membranes, for safe and natural assimilation or diffusion into the yolk or albumen or both, aided by physiological processes accompanying the development of the embryo, and in like manner other useful elements such as mineral salts, iodine or its salts, and enzymes may be safely incorporated into my incubating process for improving the content of the egg and also its hatchability and viability.

Whatever the element or elements so utilized to condition the developing embryo against any effect or tendency to depress hatchability in the course of practicing my invention for hatching fowl of selected sex, none of such elements presents difficulty as to its use quantitatively; the average amounts as well as ranges of variation in amounts of these elements in eggs are known, and quantitative inclusions thereof in the liquid carrier, for wetting the eggs as above described to achieve the umbrella effect and its advantages, are easily based upon these known factors. Moreover, because of the described safe and remote and unconcentrated distribution and storage as above described, coupled with the coaction therewith of the natural physiological processes accompanying embryo development in incubating eggs, considerable latitude is available quantitatively. For example, it is known that copper is present in the egg in the amount of 0.3 mg. as compared to an average of about 1.6 mg. of iron; it is intended for coaction with the iron for conversion into hemoglobin. Accordingly, copper salts are employed in that ratio to the iron salts; in group A-15, ferrous sulphate was supplied in the amount of 0.1 mg. per egg, representing an addition of only ⅕ of the expected average iron content of the egg. In this latter connection, because of the safety umbrella action or effect, the booster quantity of iron can be substantially varied, as within a range of variation comparable to the range of variation of iron content in eggs. Iodine occurs in hens' eggs in small quantities, such as from 0.004 to 0.01 mg. per egg; iodine or its salts may thus be supplied in virtually comparable quantity or even much greater ranges per egg, in accordance with my process, for it is known that iodine content of eggs may be widely and safely varied. It is known that, by the addition of iodine to the hens' feed, in suitable form such as sodium iodide or potassium iodide, and even also by intravenous injection of the hens with, for example, sodium iodide, the iodine content of the egg, both in the yolk and in the albumen, can be increased, but such procedures have many disadvantages which include also wide variability of results; these I can avoid by incorporating sodium iodide or potassium iodide into the liquid carrier and thus known or fixed quantities of iodine may be made available. Enzymes such as pepsin, pancreatin and trypsin, I may in like manner, as in water solution, bring to the physiological development of the embryo. Riboflavin concentrations are known to vary, as from about 3.9 µg. per gram to 7.6 µg. per gram in the yolk and from about 1.35 µg. per gram to 4.96 µg. per gram in the albumen; coupled with earlier-mentioned variables, wide latitudes of booster supply per egg, in practicing my process, are safely available. Thus elements physiologically significant to embryological development and to viability of the hatched birds, by wetting the eggs as above described, can be made effective in greatly improving hatchery efficiency and results.

*Example No. 4*

Comparison of groups A-14 (sex hormone plus vitamin) and A-15 (sex hormone plus iron) with group A-13 (sex hormones only) shows physiological improvement and increased vigor of the embryo as a result of concurrent conditioning; note the increase in achieved high sex ratio of the respective hatches, showing the counteracting of the depressing effect above noted. But by other tests I have further demonstrated improvement in hatchability as against tendency or action to depress hatchability. Groups of 70 eggs each were wetted in the manner described under Examples Nos. 1, 2 and 3 (that is, by wetting the peaked ends up to 1 to 1¼ inches of depth and at respective times of "on setting," and 4th and 6th days of incubation, there noted) and incubated, thus:

| Group | Time | Solution | Percent Hatchability |
|---|---|---|---|
| A-18 | On setting | ES (0.03 mg. D. E. S. per egg) | 30.1 |
| A-19 | do | ES (0.03 mg. D. E. S. plus 0.2 mg. Riboflavin, per egg) | 67.1 |
| A-20 | do | ES (0.03 mg. D. E. S. plus 0.1 mg. Ferrous Sulfate, per egg) | 70.0 |
| A-21 | do | Water solution of Riboflavin (0.2 mg. Riboflavin per egg) | 78.5 |
| A-22 | do | Water solution of Ferrous Sulphate (1.0 mg. Ferrous Sulfate per egg) | 77.1 |
| A-23 | 4th day | Solution same as for A-21 | 78.5 |
| A-24 | 4th and 6th days | Solution same as for A-22 (2 wettings, each 0.1 mg. ferrous sulfate per egg) | 80.0 |

While group A-18, in per cent hatchability, is exceptionally on the low side, it is one of the test series of groups A-18 to A-24 and happens to be the only group of that series that was processed and incubated according to my invention with only sex-hormone in the wetting solution and against which to compare the rest. Comparison of the rest therewith and with each other, bearing in mind the earlier above-mentioned overall average egg hatchability of 70%, shows the various advantages achievable by my invention. For example, whatever tendency or effect depressive of hatchability that may be present, even in the extreme suggested by group A-18, due to the added burden to incubation that may be imposed by the sex hormone and its liquid carrier, such tendency or effect can be materially removed or overcome; thus compare the 67.1% and 70.0% hatchabilities of groups A-19 and A-20 in which riboflavin and ferrous sulfate respectively were included in the umbrella effect and action, with the 30.1% hatchability of group A-18. Also, that the liquid carrier and sex hormone have a tendency to depress hatchability is suggested by comparison of groups A-19 (with sex-hormone) and A-21 (no sex hormone); in both the same conditioning amount of riboflavin was used and there was some lowering of hatchability in the sex-hormone group A-19. Similarly, compare group A-20 (with sex hormone) and group A-22 (no sex-hormone); in both the same conditioning amount of iron sulfate was used and there was some lowering of hatchability in the sex-hormone group A-20. The differentials in hatchabilities here substantiate that apparently some exceptional circumstance operated against hatchability in group A-18 (30.1%) for as against the 67.1% hatchability of group A-19, the hatchability for group A-18 should be more on the order of about 60%.

Groups A-21 and A-22 show the feasibility, as above pointed out, of wide variation in vitamin quantities; the latter group of eggs received twice the amount of riboflavin than the former, with further rise in hatchability. Similarly as to groups A-22 and A-24; iron sulfate content supplied to the latter was twice that supplied to the former, and in two time-spaced steps, both different from the time of application to the eggs of group A-22. Efficacy and dependable coaction of the substance or substances to supply deficiencies or to materially raise the content level thereof, and in wire quantitive variations and both before and during incubation by my process, are thus demonstrated. The substances or elements above mentioned are illustrative. In like manner and as already pointed out above, any other element, usually the same as or comparable to a normal or usual chemical constituent of the egg content, may be supplied to the egg interior under or with the safety and other advantages of the above described umbrella effect. In this manner, the composition or physiological properties of the egg, for such purposes as improving hatchability and viability, or counteracting or ameliorating tendency of the sex-hormone substance or solution to depress hatchability or viability, may be dependably and materially improved and various obstacles or disadvantages overcome.

*Example No. 5*

All of the above is further illustrated in comparative test groups including processing and incubation according to my invention for influencing the sex of chicks in male direction, thus to achieve high ratio of male to female hatched chicks. In certain of these groups, androgenic substances were used. Again, standard or usual incubator operation or practice was followed in each case or group except for wetting the eggs; in each group, including group A-28 later described (but excepting the control group C-13), the eggs were wetted by entering the peaked ends to a depth of from 1 to 1¼ inches, for about 5 seconds, into the respective solutions employed for the different groups, thus to commence the umbrella-like distribution and storage above described; all were wetted on setting, with temperatures of the eggs at 19° C. and solution temperatures between 8° C. and 11° C. Each group contained 25 eggs and the eggs were White Leghorn, all from the same flock.

Illustrative androgenic substances employed in certain of these groups are testosterone propionate U. S. P. (later referred to simply as "T. P."), methyl testosterone U. S. P. (later designated as "M. T."), and dehydroisoandrosterone (later designated as "Dehy."). The liquid carrier was ethyl alcohol. The solution for group A-25 was in the proportion of 0.65 gm. of T. P. dissolved in 100 cc. of ethyl alcohol; the above described wetting by the resultant solution supplied each egg with 2.4 mg. of T. P. For group A-25a, the solution was in the proportion of 0.0083 gm. of T. P. dissolved in 100 cc. of ethyl alcohol; each egg was, upon wetting, supplied with about 0.03 mg. of T. P. For group A-26, the solution was in the proportion of 0.65 gm. of M. T. dissolved in 100 cc. of ethyl alcohol, the wetting supplying to each egg about 2.4 mg. of M. T. For group A-26a, the ratio was 0.0083 gm. of M. T. to 100 cc. of ethyl alcohol, each egg receiving about 0.03 mg. of M. T. For group A–27, the ratio was 0.65 gm. of Dehy. to 100 cc. of ethyl alcohol, the wetting supplying to each egg 2.4 mg. of Dehy. For group A–27a, the proportion was 0.0083 gm. of Dehy. to 100 cc. of ethyl alcohol, each egg upon wetting receiving 0.03 mg. of Dehy. These several groups plus control group C–13 gave the following data and results:

| Group | Solution | No. of Chicks Hatched | Percent Hatched | Sex on Hatching No. of Females | Sex on Hatching No. of Males | Sex on Hatching Female, Percent | Sex on Hatching Male, Percent |
|---|---|---|---|---|---|---|---|
| A–25 | T. P. (2.4 mg. per egg). | 16 | 64 | 5 | 11 | 31.3 | 68.7 |
| A–26 | M. T. (2.4 mg. per egg). | 14 | 56 | 2 | 12 | 14.3 | 85.7 |
| A–27 | Dehy. (2.4 mg. per egg). | 19 | 76 | 4 | 15 | 21.1 | 78.9 |
| C–13 | Controls. | 17 | 68 | 9 | 8 | 52.9 | 47.1 |
| A–25a | T. P. (0.03 mg. per egg). | 15 | 60 | 6 | 9 | 40.0 | 60.0 |
| A–26a | M. T. (0.03 mg. per egg). | 17 | 68 | 8 | 9 | 47.1 | 52.9 |
| A–27a | Dehy. (0.03 mg. per egg). | 15 | 60 | 7 | 8 | 46.7 | 53.3 |
| A–28 | 0.4 micrograms B12 per egg. | 23 | 92 | 12 | 11 | 52.2 | 47.8 |

Again, not a wet-back. Again the control group (group C–13) quite naturally divided about half and half as to sexes of the hatched birds and its hatchability on the order of 68% could likewise be expected, being near the average, earlier noted, of 70%. In sex-influenced groups A–25, A–26, and A–27, this average 70% hatchability was surpassed in group A–27 (76%) and the average % hatchability of the three groups, about 65.3%, is very favorably comparable to the 68% hatchability of control group C–13 as well as to the recognized general average of 70%. But in these three groups A–25, A–26, A–27, note the marked difference in sex ratio; the average is close to 80% males as against a substantially 50–50 or normal split of the sexes in the control group C–13. Anything like this consistent and substantial preponderance of male over female chicks, in egg hatching, has never heretofore been accomplished; in group A–26, the ratio of males to females is 6 to 1, or about 86%; in group A–27, it is about 4 to 1, or almost 80%, and in group A–25 it is almost 70%; with overall or average hatchability, as above noted, at a high level. Again consistency of results of my invention are demonstrated.

In order further to demonstrate the just-stated consistency and efficacy of results of my invention, other groups of eggs were processed simultaneously with groups A–25, A–26, and A–27; these included groups A–25a, A–26a, and A–27a in which, respectively, the same androgens were used as in groups A–25, A–26 and A–27 but in quantitatively much smaller dosages per egg, all as pointed out above. In the former groups, the eggs received in each case, 0.03 mg. of the male sex hormone or hormone-like substance (or androgen) instead of 2.4 mg. thereof in the latter, the quantitative difference in each case being in the ratio of 0.03 to 2.4 or 0.0125 to 1 or 1.25%. Even with such very substantial decrease in dose of the androgen per egg, consistency of preponderance of male over female hatched chicks is retained though at somewhat lower ratios, all as noted in the preceding tabulation; this widespread quantitative divergence or differential also substantiates the uniqueness, dependability and safety of action achieved by the above-described umbrella-like effect or widely distributed and peripheral storage of the androgen in harmless concentrations for being drawn upon and used by the natural processes of the developing embryo or by or through the physical characteristics or properties of the egg contents, all as above described. In these respects, too, the practicability of practicing my invention in egg husbandry and poultry farming is enhanced and simplified, as well as emphasized, and the poultry farmer need only follow simple and flexible instructions to fit my processing simply and economically into his otherwise normal or routine practices. Moreover, note that hatchability, in these groups A–25a A–26a, and A–27a, on the order of 63.3%, also compares very favorably with the 68% achieved in the control group C–13.

For still further comparative purposes, another group, group A–28, also of 25 White Leghorn eggs from the same flocks, was simultaneously processed. In this group A–28, no sex-influencing hormone or hormone-like substance was employed but, on setting, the eggs were processed with a solution made up in the proportion of 10 tablets, each containing 25 micrograms of the vitamin complex $B_{12}$, dissolved in 250 cc. of distilled water, so that each egg received, upon wetting, 0.4 micrograms of vitamin $B_{12}$, as noted in the tabulation. Since no sex-influencing substance was employed on group A–28, the proximate 50–50 sex ratio of hatched chicks was to be expected and virtually materialized, for out of the 23 chicks hatched, 12 were female and 11 male, making the respective percentages of 52.2% and 47.8% virtually identical with the results achieved by control group C–13. But note the vastly material increase in hatchability; instead of the 68% hatchability in control group C–13, hatchability is now at the high figure of 92%, 23 hatched chicks out of 25 incubated eggs. Thus the above-noted efficacy of my process in also materially raising hatchability and viability is further shown; I mentioned earlier above other constituents, by way of illustration, that may be supplied by way of my process for use by or in the natural or physiological processes of the developing embryo and thus safely and economically overcome inherent deficiencies in materials vital or important to embryo survival, sound growth and development, and better health and vigor upon hatching.

In these connections, it may be noted that by contrast, many attempts have heretofore been made to improve hatchability and viability by attempting through diet or feeding of the egg-laying hen, to materially influence in favorable direction the quantitative amounts of such constituents or materials. As earlier noted, it is known that, in eggs, such constituents or elements vary widely in quantity; some are present in varying quantities of substantial order of magnitude compared to others which are present, also in varying quantities, but in orders of magnitude much smaller, sometimes on the order of a trace or traces. It is known that among the mineral constituents are some that are virtually indispensable to the life and growth of the embryo through the quantitative requirement is very minute. A deficiency of some essential constituent, such as vitamins, or enzymes, or certain minerals, greatly influences, adversely, the normal formation of the chick and its hatchability. It is also known that there are vagaries and limits in seeking to make up for such possible deficiencies by feed or nutrition modification of the hen; responses to such feed modification are quite variable. For example, it is well known that calcium must be adequately supplied in a hen's feed, as by calcium carbonate or oyster shell, for egg-shell formation and for storage in the yolk and albumen for ultimate use by the embryo; calcium deficiency results in thin egg-shells and is easily avoided by adequate supply by way of diet or feed. Calcium content of the yolk and of the albumen are, however, little affected, quantitatively, by variations of calcium in the feed. Calcium and phosphorous affect hatchability and they are usually present in the yolk and in the albumen in a ratio that is not materially affected by variations of calcium and phosphorus content in the feed; however the two require the presence of vitamin D in suitable quantity and must themselves be present in adequate quantity for good hatchability and viability. Iodine content responds to inclusions thereof in hen's feed as does manganese even though quantitatively the latter, essential in oxidation reactions in living cells of the embryo, is present in the egg in minute or trace quantities, more in the yolk than in the albumen. But the quantitative presence of other useful or vital elements including iron and copper, cannot be materially affected through diet or feed modifications; it is however, recognized that heredity probably is the principal factor in accounting for quantitative variations of these elements in eggs. For example, it is known that individual hens tend to lay eggs of fairly uniform iron content though quantitatively it varies from hen to hen and is apparently accounted for on the basis of heredity. Accordingly, past attempts to produce eggs controllably containing desired or needed quantity of a vital or health-giving constituent, or thus to improve hatchability and viability, have sought results by costly and complicated feed compositions or complex nutrition modification and by hen selection, the latter a cumbersome and long-drawn out procedure and involving also such matters as breeds, cross-breeding, and strains of birds, and it has not been possible to overcome the inherent variabilities and unpredictable factors such as those above mentioned or those of natural variations. While advances have been made, it is recognized that there are definite limitations; some of the latter I mentioned earlier above, such as the great variations in the capacity of hens of different breeds and strains and even individually to "carry over" to the egg, one or more vital or material constituents in appropriate quantity. By my invention it is possible in a simple and economical manner to insure safely the supply of useful elements to the egg to be incubated, free from the above complications and disadvantages. Also it is possible for the hen, particularly if diseased, to transmit to the egg bacterial or like infection; for example, bacterial infection of the egg may take place during its formation, as in the ovary or the oviduct. Also, there are other ways in which the egg may become infected. The hazards to hatchability and viability, caused by such infection, are recognized and known, yet no dependable, simple, or economical means to circumvent them are known except to seek amelioration by such complex and variable expedients as nutrition modification and strain or breed selection described above.

However, by my invention, I am enabled to combat such infections effectively and simply, as by including in a suitable liquid carrier, with or without the estrogen or androgen or other element such as any one or more of those above mentioned, an antibiotic substance or combination of antibiotic substances, and applying the resultant liquid solution as a wettant to and for the egg, as in the manner above described and, for incubation, preferably on setting. Here I may employ penicillin, penicillin salts or derivatives, streptomycin, streptomycin derivatives, neomycin and neomycin sulfate, and their various modifications and derivatives. Penicillin and its salts and derivatives are used or included in the carrier liquid employed in proportions such that each wetted egg receives about 1000 units and streptomycin and its derivatives and the other antibiotics are employed in such proportions that each egg receives about 1.0 milligram. Upon wetting of the shell exterior, the liquid carrier with the antibiotic contained therein, becomes more or less uniformly distributed throughout the egg membrane and the shell membrane above described, free from any possible harmful concentration, whence, by the above described umbrella effect, it becomes and is available for action upon infection in or carried by these membranes and for diffusion into the interior of the egg for action upon contagion or infection therein contained and, as incubation proceeds the antibiotic, peripherally stored in the above mentioned membranes, is drawn upon by the natural physiological processes of the developing embryo for preventing infection of the latter or for action upon internally contained infection; the antibiotic can thus be taken up by the developing vascular system, drawing upon it at a natural rate, from its peripheral storage in the membrane. Thus the developing embryo can be dependably protected both against congenital infection and against externally acquired infection. Losses from diseased embryos and diseased hatched chicks can thus be materially reduced and the factors of hatchability and viability materially increased.

*Example No. 6*

Recurring to the earlier above described many group demonstrations of influencing sex, according to my invention, in female direction, estrogens for that purpose other than diethylstilbestrol (D. E. S.) are, as above noted, equally effective as I have demonstrated by many other tests, illustratively as in those about to be described and hereinafter tabulated. In these, my process was again worked in conjunction with otherwise standard or usual incubator equipment; in each group (except the control group C–14), the eggs were wetted by entering the peaked ends to a depth of from 1 to 1¼ inches, for about 5 seconds, into the respective solutions employed for the various groups, thus to initiate the umbrella-like protective storage and peripheral distribution above described. All were wetted on setting; hence were wetted as an initial step in my sex-controlling method of incubation. The temperature of the eggs was 17° C. and solution temperatures were from 7° C. to 13° C. Each group contained 50 eggs and the eggs were "crosses," New Hampshire Reds on Barred Rock hens.

Illustrative estrogenic substances employed, aside from the earlier described D. E. S. which was employed also in group A–29 below, are dimethyl ethyl allenolic acid (later designated as "D. E. A."), estrone, estradiol, and estriol. The liquid carrier, illustratively, was ethyl alcohol. In each case, the solution for wetting the eggs was in the proportion of 1.625 gm. of the estrogen, dissolved in 250 cc. of the ethyl alcohol; the above described wetting by the resultant solution supplied each egg with 2.4 mg. of the estrogen. These several groups plus control group C–14 gave the following data and results:

| Group | Solution | No. of Chicks Hatched | Percent Hatched | Sex on Hatching | | Sex on Hatching | |
|---|---|---|---|---|---|---|---|
| | | | | No. of Females | No. of Males | Female, Percent | Male, Percent |
| A–29 | D. E. S. (2.4 mg. per egg). | 28 | 56 | 27 | 1 | 96.4 | 3.6 |
| A–30 | D. E. A. (2.4 mg. per egg). | 31 | 62 | 20 | 11 | 64.5 | 35.5 |
| A–31 | Estrone (2.4 mg. per egg). | 35 | 70 | 34 | 1 | 97.1 | 2.9 |
| A–32 | Estradiol (2.4 mg. per egg). | 31 | 62 | 31 | 0 | 100 | None |
| A–33 | Estriol (2.4 mg. per egg). | 41 | 82 | 39 | 2 | 95.1 | 4.9 |
| C–14 | Controls | 33 | 66 | 17 | 16 | 51.5 | 48.5 |

To these tabulated results should be added, as in the other demonstrations, that there was not a wet-back among the resultant birds. Again the control group (group C–14) hatched chicks divided just about equally between the two sexes and its hatchability factor, 66%, is a close approximation to the experienced average (70%). In the sex-controlled groups A–29, A–30, A–31, A–32 and A–33, hatchability averages 66.2%, better than just matching that of the control group; the latter was surpassed in group A–31 (70%) and in group A–33 (82%). But again note the consistency of sexing control, in the desired direction, achieved by my process in groups A–29 to A–33; the average is 91% females as against a substantially 50–50 or normal even division between male and female in control group C–14. In group A–32, the ratio of female to male is 100%; in group A–29, it is 27 to 1, or 96%; in group A–31, it is 34 to 1, or 97%; in group A-33, it is 39 females to 2 males, or 95%; in group A-30, it is about 2 to 1, or about 65%.

From the foregoing, the practice of my invention will now be clear. The many group tests above set forth as well as many others I have carried on demonstrate not only consistency and safety of control of sex in the desired direction with healthy results but also the many advantages above described, particularly when the tabulated results are translated into the economics of hatchery operations. For example, my process is one which the hatchery operator can easily and inexpensively carry on himself, making use of standard or known incubator equipment and by following simple instructions that can be carried out without requiring the hiring of specialists or other skilled personnel; he can even employ, as for wetting the eggs to initiate the above-described umbrella effect of safety of distribution and storage for natural use by the physiological functions of the developing embryo, the same open-work egg tray that holds the eggs in the incubator. There are no risks or questions as to timing. Individual handling of eggs is avoided; even group or quantity handling is exceedingly simple; if wetted "on setting," repetitive handling even in groups is not necessary; if wetted after setting as on a day up to about the 6th day of incubation, only one additional handling is necessary; these available times of wetting provide a desirable flexibility that can be of great advantage especially in the operation of large-scale hatcheries; if wetted by supplying liquid carrier (with the sex hormone or other contained element) in atomized form, preferably along with humidification of the incubator atmosphere, no additional handling of eggs is necessary at all; and with the eggs wetted, the action of the above-described umbrella effect makes it possible to avoid any subsequent need of manual supervision or inspection beyond such as accompanies routine incubator operation.

Other advantages are above pointed out and still others will now be clear in view of the foregoing disclosure of my invention; it will be seen that my invention is of a thoroughly practical nature and that the various objects above noted are successfully achieved.

As many possible embodiments may be made of the mechanical features of the above invention, and as the art herein described might be varied in various parts, all without departing from the scope of the invention, it is to be understood that all matter hereinabove set forth is to be interpreted as illustrative and not in a limiting sense.

I claim:

1. The steps in a method of hatching avian eggs which comprise placing fertile eggs in the removable open-work tray of an incubator which is provided with heating means to maintain incubating temperature and with means for supplying the incubator atmosphere with moisture in suitable humidifying form; effecting distribution substantially uniformly throughout the thin interiorly-contained egg membrane and shell membrane of each egg carried by the tray, for attenuated storage therein in peripherally enveloping relation to the albumen and in remote relation to the albumen-enveloped other content of the egg, of a liquid-carried sex-hormone substance selected from one of the sub-classes, namely, (a) estrogens and (b) androgens, of the class of sex hormones and a liquid-carried substance that biologically improves embryological development and hatchability and a liquid-carried bactericide, by wetting exteriorly the shells of the tray-carried eggs with the liquid-carried substances and their liquid carriers; subjecting the eggs to incubating conditions provided by said heating means and moisture-bearing atmosphere for developing the physiological processes of the embryos of embryonating eggs in the tray to effect transmission in each, from the peripheral attenuated storage thereof in said membranes, of the sex-hormone substance to the embryonic sex-differentiating gonads to influence the latter, and of said second-mentioned substance to the embryo for assimilation, and of said bactericide to seats of infection; and, upon hatching, removing the hatched birds.

2. The steps in a method of hatching avian eggs which comprise placing fertile eggs in the removable open-work tray of an incubator which is provided with heating means to maintain incubating temperature and with means for supplying the incubator atmosphere with moisture in suitable humidifying form; effecting distribution substantially uniformly throughout the thin interiorly-contained egg membrane and shell membrane of each egg carried by the tray, for attenuated storage therein in peripherally enveloping relation to the albumen and in remote relation to the albumen-enveloped other content of the egg, of a liquid-carried sex-hormone substance selected from one of the sub-classes, namely, (a) estrogens and (b) androgens, of the class of sex hormones and a liquid-carried substance that biologically improves embryological development and hatchability and a liquid-carried bactericide, by wetting all of the tray-carried eggs by applying exteriorly to the shells thereof the liquid-carried substances and their liquid carriers; putting the tray, with the wetted eggs therein, in the incubator; subjecting the eggs to incubating conditions provided by said heating means and moisture-bearing atmosphere for developing the physiological processes of the embryos of embryonating eggs in the tray to effect transmission in each, from the peripheral attenuated storage thereof in said membranes, of the sex-hormone substance to the embryonic sex-differentiating gonads to influence the latter, and of said second mentioned substance to the embryo for assimilation, and of said bactericide to seats of infection; and, upon hatching, removing the hatched birds.

3. The steps in a method of hatching avian eggs which comprise placing fertile eggs in the removable open-work tray for an incubator which is provided with heating means to maintain incubating temperature and with means for supplying the incubator atmosphere with moisture in suitable humidifying form; effecting distribution substantially uniformly throughout the thin interiorly-contained egg membrane and shell membrane of each egg carried by the tray, for attenuated storage therein in peripherally enveloping relation to the albumen and in remote relation to the albumen-enveloped other content of the egg, of a liquid-carried sex-hormone substance selected from one of the sub-classes, namely, (a) estrogens and (b) androgens, of the class of sex hormones and a liquid-carried substance that biologically improves embryological development and hatchability and a liquid-carried bactericide, by supplying the liquid-carried substances and their liquid carriers to said moisture-supplying means for distribution thereof, in substantially atomized form, to the exteriors of the shells of the tray-carried eggs in the incubator during at least the earlier portion of the period of incubation; subjecting the eggs to incubating conditions provided by said heating means and moisture-bearing atmosphere for developing the physiological processes of the embryos of embryonating eggs in the tray to effect transmission in each, from the peripheral attenuated storage thereof in said membranes, of the sex-hormone substance to the embryonic sex-differentiating gonads to influence the latter, and of said second-mentioned substance to the embryo for assimilation, and of said bactericide to seats of infection; and, upon hatching removing the hatched birds.

4. The steps in a method of hatching avian eggs which comprise placing fertile eggs, with their peaked ends downward, in the removable open-work tray of an incubator which is provided with heating means to maintain incubating temperature and with means for supplying the incubator atmosphere with moisture in suitable humidifying form; effecting distribution substantially uniformly throughout the thin interiorly-contained egg membrane and shell membrane of each egg carried by the tray, for attenuated storage therein in peripherally enveloping relation to the albumen and in remote relation to the albumen-enveloped other content of the egg, of a liquid-carried sex-hormone substance selected from one of the sub-classes, namely, (a) estrogens and (b) androgens, of the class of sex hormones and a liquid-carried substance that biologically improves embryological development and hatchability and a liquid-carried bactericide, by simultaneously wetting the exterior of the peaked ends of the shells of the eggs by entering the downwardly projecting peaked ends of the tray-carried eggs into the liquid-carried substances and their liquid carriers to deposit the latter thereon externally; putting the tray, with the wetted eggs therein, in the incubator; subjecting the eggs to incubating condition provided by said heating means and moisture-bearing atmosphere for developing the physiological processes of the embryos of embryonating eggs in the tray to effect transmission in each, from the peripheral attenuated storage thereof in said membranes, of the sex-hormone substance to the embryonic sex-differentiating gonads to influence the latter, and of said second-mentioned substance to the embryo for assimilation, and of said bactericide to seats of infection; and, upon hatching, removing the hatched birds.

5. The steps in a method as claimed in claim 4 in which the step of simultaneously wetting the tray-carried eggs with the liquid-carried sex-hormone substance is effected on any day from and including the first to about the sixth day of incubation.

6. The steps in a method as claimed in claim 4 in which the step of simultaneously wetting the tray-carried eggs with the liquid-carried sex-hormone substance is effected on or just prior to "setting" of the tray-carried eggs for incubation.

7. The steps in a method of hatching avian eggs which comprise placing fertile eggs in the removable open-work tray of an incubator; effecting distribution substantially uniformly throughout the thin interiorly-contained egg membrane and shell membrane of each egg carried by the tray, for attenuated storage therein in peripherally enveloping relation to the albumen and in remote relation to the albumen-enveloped other content of the egg, of a liquid-carried sex-hormone substance selected from one of the sub-classes, namely, (a) estrogens and (b) androgens, of the class of sex hormones by wetting exteriorly the shells of the tray-carried eggs with the liquid-carried sex-hormone substance and its liquid carrier; subjecting the wetted eggs to incubating conditions in the incubator for developing the physiological processes of the embryos of embryonating eggs in the tray to effect transmission in each, from the peripheral attentuated storage thereof in said membranes, of the sex-hormone substance to the embryonic sex-differentiating gonads to influence the latter; and, upon hatching, removing the hatched birds.

8. The steps in a method as claimed in claim 7 in which the step of wetting exteriorly the shells of the tray-carried eggs comprises supplying the atmosphere of the incubator, during at least the first portion of the incubating period, with the sex-hormone-carrying liquid in substantially atomized form for deposit thereof on the exterior of the shells of the tray-carried eggs.

9. The steps in a method as claimed in claim 7 in which the step of wetting exteriorly the shells of the tray-carried eggs comprises applying the sex-hormone-carrying liquid carrier to the exterior of the shells of the tray-carried eggs extraneously of the incubator and then placing the tray with the wetted eggs in the incubator.

10. The steps in a method as claimed in claim 9 in which the step of wetting the tray-carried eggs is effected on any day from and including the first to about the sixth day of incubation.

11. The steps in a method as claimed in claim 9 in which the step of wetting the tray-carried eggs is effected on or just prior to "setting" of the tray-carried eggs for incubation.

12. The steps in a method as claimed in claim 7 in which the step of placing the eggs in the tray comprises placing them therein with their peaked ends projecting downwardly and in which the step of wetting the shells of the tray-carried eggs comprises substantially simultaneously entering the downwardly projecting peaked ends of the tray-carried eggs, extraneously of the incubator, into the sex-hormone-carrying liquid carrier to deposit the latter thereon externally and placing the wetted tray-carried eggs in the incubator.

13. The steps in a method as claimed in claim 12 in which the step of entering the peaked ends of the tray-carried eggs into the sex-hormone-carrying liquid carrier is effected on or just prior to "setting" of the tray-carried eggs for incubation in the incubator.

14. The steps in a method as claimed in claim 12 in which the step of entering the peaked ends of the tray-carried eggs into the sex-hormone-carrying liquid carrier is effected on any day from and including the first to about the sixth day of incubation.

15. The steps in a method of hatching avian eggs which comprise placing fertile eggs in the removable open-work tray of an incubator; effecting distribution substantially uniformly throughout the thin interiorly-contained egg membrane and shell membrane of each egg carried by the tray, for attenuated storage therein in peripherally enveloping relation to the albumen and in remote relation to the albumen-enveloped other content of the egg, of a liquid carried substance that biologically improves embryological development and hatchability by wetting exteriorly the shells of the tray-carried eggs with the biological-substance-carrying liquid carrier; subjecting the wetted eggs to incubating conditions in the incubator for developing the physiological processes of the embryos of embryonating eggs in the tray to effect transmission in each, from the peripheral attenuated storage thereof in said membranes, to the developing embryo for assimilation; and, upon hatching, removing the hatched birds.

16. The steps in a method as claimed in claim 15 in which the biological substance carried by the liquid carrier comprises a vitamin.

17. The steps in a method as claimed in claim 15 in which the biological substance carried by the liquid carrier comprises an element coacting, as assimilated by the embryo, in the production of hemoglobin.

18. The steps in a method as claimed in claim 15 in which the biological substance carried by the liquid carrier comprises compounds of iron and copper coacting, as assimilated by the embryo, in the production of hemoglobin.

19. The steps in a method as claimed in claim 15 in which the biological substance carried by the liquid carrier comprises an enzyme.

20. The steps in a method as claimed in claim 15 in which the biological substance carried by the liquid carrier comprises an iodine compound.

21. The steps in a method of hatching avian eggs which comprise placing fertile eggs in the removable open-work tray of an incubator; effecting distribution substantially uniformly throughout the thin interiorly-contained egg membrane and shell membrane of each egg carried by the tray, for attenuated storage therein in peripherally enveloping relation to the albumen and in remote relation to the albumen-enveloped other content of the egg, of a liquid carried bactericide, by wetting exteriorly the shells of the tray-carried eggs with the bactericide-carrying liquid carrier; subjecting the eggs to incubating conditions in the incubator for developing the physiological processes of the embroys of embryonating eggs in the tray to effect transmission in each, from the peripheral attenuated storage thereof in said membranes, of the bactericide to seats of infection; and upon hatching, removing the hatched birds.

22. The steps in a method of hatching avian eggs which comprise placing fertile eggs in the removable open-work tray of an incubator; effecting distribution substantially uniformly throughout the thin interiorly-contained egg membrane and shell membrane of each egg carried by the tray, for attenuated storage therein in peripherally enveloping relation to the albumen and in remote relation to the albumen-enveloped other content of the egg, of a liquid carried antibiotic, by wetting exteriorly the shells of the tray-carried eggs with the antibiotic-carrying liquid carrier; subjecting the eggs to incubating conditions in the incubator for developing the physiological processes of the embryos of embryonating eggs in the tray to effect transmission in each, from the peripheral attenuated storage thereof in said membranes, of the antibiotic to seats of infection; and, upon hatching, removing the hatched birds.

23. The steps in a method as claimed in claim 22 in which the antibiotic comprises an antibiotic selected from the group consisting of penicillin, penicillin salts, and penicillin derivatives.

24. The steps in a method as claimed in claim 22 in which the antibiotic comprises an antibiotic selected from the group consisting of streptomycin, streptomycin derivatives, neomycin and neomycin sulphate, and modifications and derivatives thereof.

25. The steps in a method of hatching avian eggs which comprise effecting distribution throughout the thin interiorly contained egg membrane and shell membrane of the fertile eggs, for attenuated storage therein in peripherally enveloping relation to the albumen and in remote relation to the albumen-enveloped other content of the egg, of a liquid-carried sex-hormone substance selected from one of the sub-classes, namely, (a) estrogens and (b) androgens, of the class of sex hormones and a liquid-carried substance that biologically improves embryological development and a liquid-carried bactericide by wetting the exterior of the shells therewith; and subjecting the eggs to incubating conditions of heat for developing the physiological processes of the embryos of embryonating eggs to effect transmission in each, from the peripheral attenuated storage thereof in said membranes, of the sex-hormone substance to the embryonic sex-differentiating gonads to influence the latter, and of said second-mentioned substance to the embryo for assimilation, and of said bactericide to seats of infection; and, upon hatching, removing the hatched birds.

26. The steps in a method of hatching avian eggs which comprise effecting distribution throughout the thin interiorly contained egg membrane and shell membrane of the fertile eggs, for attenuated storage therein in peripherally enveloping relation to the albumen and in remote relation to the albumen-enveloped other content of the egg, of a liquid carried sex-hormone substance selected from one of the sub-classes, namely, (a) estrogens and (b) androgens, of the class of sex hormones by wetting the exterior of the shells therewith, subjecting the eggs to incubating conditions of heat for developing the physiological processes of the embryos of embryonating eggs to effect transmission in each, from the peripheral attenuated storage thereof in said membranes, of the sex-hormone substance to the embryonic sex-differentiating gonads to influence the latter; and, upon hatching, removing the hatched birds.

27. The steps in a method as claimed in claim 26 in which the step of wetting the exterior of the shells of the eggs is effected on any day from and including the first to about the sixth day of incubation.

28. The steps in a method as claimed in claim 26 in which the step of wetting the exterior of the shells of the eggs is effected on or just prior to "setting" of the eggs for incubation.

29. The steps in a method as claimed in claim 26 in which the step of wetting the exterior of the shells of the eggs is effected over a substantial portion of the incubating period including a time period corresponding to the early embryonic development by supplying the sex-hormone-carrying liquid carrier in substantially atomized form for deposit thereof on the exterior of the shells of the eggs.

30. The steps in a method as claimed in claim 26 in which the step of wetting the exterior of the shells of the eggs is effected by immersion of the eggs, for a time period on the order of several seconds, into the sex-hormone-carrying liquid carrier.

31. The steps in a method as claimed in claim 26 in which the step of wetting the exterior of the shells of the egg is effected by wetting a substantial area of only the peaked ends of the shells of the eggs.

32. The steps in a method of hatching avian eggs which comprise effecting distribution throughout the thin interiorly contained egg membrane and shell membrane of the fertile eggs, for attenuated storage therein in peripherally enveloping relation to the albumen and in remote relation to the albumen-enveloped other content of the egg, of a liquid-carried biological substance that has the property of biologically improving embryological development and hatchability, by placing the eggs in an open-work tray to thereby materially expose the exterior surfaces of the shells thereof and wetting the trayed eggs by applying exteriorly to the shells thereof said liquid-carried substance in thin layer-like form distributed throughout at least a substantial area of each egg; subjecting the eggs to conditions of incubating heat for developing the physiological processes of the embryos of embryonating eggs to effect transmission in each, from the peripheral attenuated storage thereof in said membranes, of the biologically-acting substance to the embryo for assimilation; and, upon hatching, removing the hatched birds.

33. The steps in a method of hatching avian eggs which comprise effecting distribution throughout the thin interiorly contained egg membrane and shell membrane of the fertile eggs, for attenuated storage therein in peripherally enveloping relation to the albumen and in remote relation to the albumen-enveloped other content of the egg, of a liquid-carried bactericide, by wetting the exterior of the shells therewith; subjecting the eggs to conditions of incubating heat for developing the physiological processes of the embryos of embryonating eggs to effect transmission in each, from the peripheral attenuated storage thereof in said membranes, of the bactericide to seats of infection; and, upon hatching, removing the hatched birds.

No references cited.